United States Patent
Moghal et al.

(10) Patent No.: US 10,907,810 B1
(45) Date of Patent: Feb. 2, 2021

(54) UNIVERSAL MOUNT ADAPTER FOR LIGHT FIXTURES

(71) Applicant: SIGNIFY HOLDING B.V., Eindhoven (NL)

(72) Inventors: Khurram Moghal, Senoia, GA (US); Tyler Brian Morris, Liverpool, NY (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/711,512

(22) Filed: Dec. 12, 2019

(51) Int. Cl.
| | |
|---|---|
| *F21V 21/088* | (2006.01) |
| *F21V 21/14* | (2006.01) |
| *F21W 131/105* | (2006.01) |
| *F21Y 115/10* | (2016.01) |

(52) U.S. Cl.
CPC ............ *F21V 21/088* (2013.01); *F21V 21/14* (2013.01); *F21W 2131/105* (2013.01); *F21Y 2115/10* (2016.08)

(58) Field of Classification Search
CPC .... F21V 21/088; F21V 21/14; F21Y 2115/10; F21W 2131/105
See application file for complete search history.

(56) References Cited

U.S. PATENT DOCUMENTS

| | | | | |
|---|---|---|---|---|
| 4,852,840 | A * | 8/1989 | Marks | F16B 2/065 248/230.4 |
| 8,337,058 | B2 | 12/2012 | Gordin et al. | |
| 8,931,932 | B2 * | 1/2015 | Lipscomb | F21V 31/03 362/362 |
| 9,494,306 | B1 | 11/2016 | Newton | |
| 9,550,449 | B2 * | 1/2017 | Paine | B60Q 1/24 |
| 9,896,021 | B2 * | 2/2018 | Speropoulos | B60Q 1/305 |
| 2008/0089071 | A1 * | 4/2008 | Wang | F21V 29/763 362/294 |
| 2008/0266859 | A1 * | 10/2008 | Palmisano | F21V 21/22 362/249.07 |
| 2011/0255293 | A1 * | 10/2011 | Lipscomb | F21V 31/03 362/362 |
| 2015/0076300 | A1 * | 3/2015 | Eboli | F16B 2/06 248/214 |
| 2016/0319988 | A1 * | 11/2016 | Mathews | F16M 13/027 |
| 2017/0175960 | A1 * | 6/2017 | Parres | F16M 13/027 |

* cited by examiner

*Primary Examiner* — Isiaka O Akanbi
*Assistant Examiner* — Glenn D Zimmerman

(57) ABSTRACT

An assembly for mounting light fixtures to a light tower includes an upper portion and a lower clamping portion. One of these components may be an L-shaped stationary portion, and the other may be a sliding portion. One or more of the portions have mounting holes adapted to receive fasteners that couple the light fixture to the assembly. The portions may be clamped together in use to provide a clamping force around the light tower to secure the light to the tower.

20 Claims, 5 Drawing Sheets

UNIVERSAL MOUNT ADAPTER FOR LIGHT FIXTURES

BACKGROUND

The advent of light emitting diode (LED)-based luminaires (e.g., light fixtures) has provided sports arenas, stadiums, other entertainment facilities, and other commercial and industrial facilities the ability to achieve instant on-off capabilities, intelligent controls and adjustability while delivering excellent light quality, consistent light output, and improved energy efficiency.

A luminaire is a lighting unit that includes an LED lamp or lamps together with components designed to connect the LED lamps to a power supply, to distribute the light, to position the LED lamps, and to protect the LED lamps. A luminaire is often individually oriented in reference to certain unique points on or near the field or target area to be lighted, with multiple luminaires positioned and oriented strategically to illuminate the entire field or target area to be lighted.

Generally, in large venues such as stadiums, multiple lighting units are mounted on each of multiple elevated lighting poles, with one or more crossbeams acting as the mounting points for each lighting unit. As LED-based luminaires have gained popularity for their above-identified advantages, many venues have sought to replace existing lighting fixtures. However, the mounting points, fixtures, and spacing that exists on the crossbeams of lighting poles is not optimized for luminaires, requiring substantial modifications to (and/or complete replacement of) the crossbeams for installation of luminaires to be possible. Due to the elevated position of the crossbeams on the lighting poles, such modifications and/or replacement of the crossbeams is both time-consuming and costly.

Accordingly, this document describes systems and methods that are directed to solving the issues described above, and/or other problems.

SUMMARY

In various embodiments a mount adapter assembly for use with light fixtures on a lighting tower includes an upper mounting portion and a lower clamping portion coupled to the upper mounting portion. The upper mounting portion includes a top mounting portion wall, a first mounting portion sidewall, a second mounting portion sidewall, and a bottom mounting portion wall. The top mounting portion wall includes at least one mounting hole configured for the coupling of a light fixture to the mount adapter assembly. The lower clamping portion includes a top clamping portion wall, a first clamping portion sidewall, a second clamping portion sidewall opposite the first clamping portion sidewall, and one or more fasteners extending through both the first clamping portion sidewall and the second clamping portion sidewall so as to apply a clamping force between the first clamping portion sidewall and the second clamping portion sidewall.

Optionally, the first mounting portion sidewall, the second mounting portion sidewall or both may include an opening formed to allow access to an interior of the upper mounting portion. The lower clamping portion may be formed in an inverted U-shape. Also, the mount adapter assembly may include one or more sleeves extending between the first clamping portion sidewall and the second clamping portion sidewall. The one or more fasteners may extend through the one or more sleeves. Each fastener may have a bolt-and-nut configuration. The top clamping portion wall of the lower clamping portion may be coupled to the bottom mounting portion wall of the upper mounting portion. A space between the first clamping sidewall portion and the second clamping sidewall portion may be sized to accommodate the width of a crossbeam of the lighting tower, and a space between the top clamping portion wall and one or more fasteners may be sized to accommodate the height of the crossbeam.

In other embodiments, a mount adapter assembly for use with light fixtures on a lighting tower includes an L-shaped stationary portion and a sliding portion. The L-shaped stationary portion includes a horizontally-extending top surface a vertically-extending rear sidewall. The horizontally-extending top surface includes one or more mounting holes configured for the coupling of a light fixture to the mount adapter assembly. The sliding portion includes a horizontally-extending top portion and a vertically-extending lower wall. One or more fasteners extend through both the vertically-extending rear sidewall of the L-shaped stationary portion and the vertically-extending lower wall of the sliding portion so as to apply a clamping force between the vertically-extending rear sidewall and the vertically-extending lower wall.

Optionally, in such embodiments the horizontally-extending top surface may include elongated slots, and the horizontally-extending top portion and the vertically-extending lower wall of the sliding portion may be coupled by a pair of tongues extending through a pair of the elongated slots. The pair of tongues may be configured to maintain the vertically-extending lower wall parallel relative to the vertically-extending rear sidewall. The mount adapter assembly also may include at least one additional fastener configured to extend through at least one of the elongated slots so as to secure the sliding portion relative to the L-shaped stationary portion.

Also optionally, in such embodiments the mount adapter assembly may include various associated through-hole pairs formed through the respective vertically-extending lower wall and the vertically-extending rear sidewall. The through-hole pairs may be positioned vertically relative to one another, and the may be configured to allow for a pair of the fasteners to be coupled to the vertically-extending lower wall and the vertically-extending rear sidewall at various points.

In other embodiments, a mount adapter assembly for use with light fixtures on a lighting tower includes an L-shaped stationary portion and a sliding portion. The L-shaped stationary portion may include a horizontally-extending top surface and a vertically-extending rear sidewall. The vertically-extending rear sidewall includes a various through-hole pairs positioned vertically relative to one another. The horizontally-extending top surface may include one or more mounting holes configured for the coupling of a light fixture to the mount adapter assembly. The sliding portion may include a horizontally-extending top portion and a vertically-extending lower wall. The vertically-extending lower wall may include various through-hole pairs positioned relative to one another. The mount adapter assembly also may include a pair of fasteners extending through respective through-hole pairs of the vertically-extending rear sidewall of the L-shaped stationary portion and the vertically-extending lower wall of the sliding portion so as to apply a clamping force between the vertically-extending rear sidewall and the vertically-extending lower wall.

Optionally, in such embodiments the horizontally-extending top surface may include elongated slots. The horizontally-extending top portion and the vertically-extending lower wall of the sliding portion may be coupled by a pair of tongues extending through a pair of the elongated slots. The pair of tongues may be configured to maintain the vertically-extending lower wall parallel relative to the vertically-extending rear sidewall. Also, the mount adapter assembly may include at least one additional fastener configured to extend through at least one of the elongated slots so as to secure the sliding portion relative to the L-shaped stationary portion.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the terms "luminaire," "light fixture," "illumination device" and "lighting device" may be used interchangeably to refer to a device that includes a source of optical radiation. Sources of optical radiation may include, for example, light emitting diodes (LEDs), light bulbs, ultraviolet light or infrared sources, or other sources of optical radiation. In the embodiments disclosed in this document, the optical radiation emitted by a luminaire includes visible light. A luminaire will also include a housing, one or more electrical components for conveying power from a power supply to the device's optical radiation source, and optionally control circuitry (e.g., driver circuits). A "lighting tower" is a structure that supports multiple lighting fixtures in an above-ground location.

When used in this document, terms such as "top" and "bottom," "upper" and "lower", "inner" and "outer", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Figure 1A:
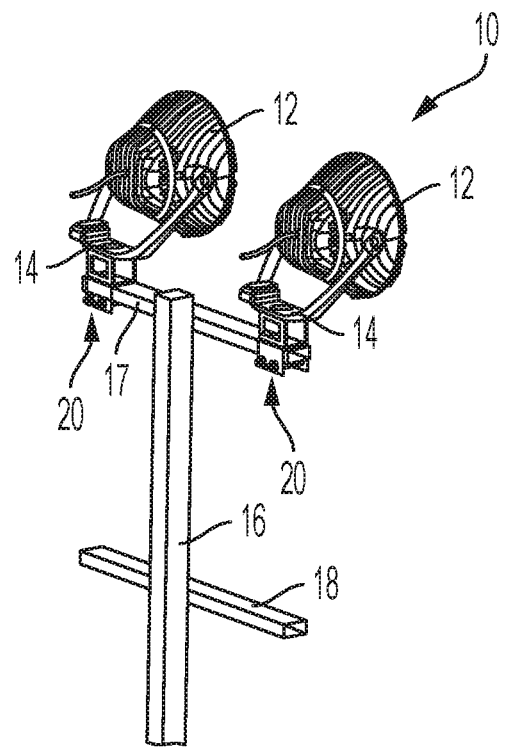
FIG. 1A illustrates a rear perspective view of an example lighting configuration.
Figure 1B:
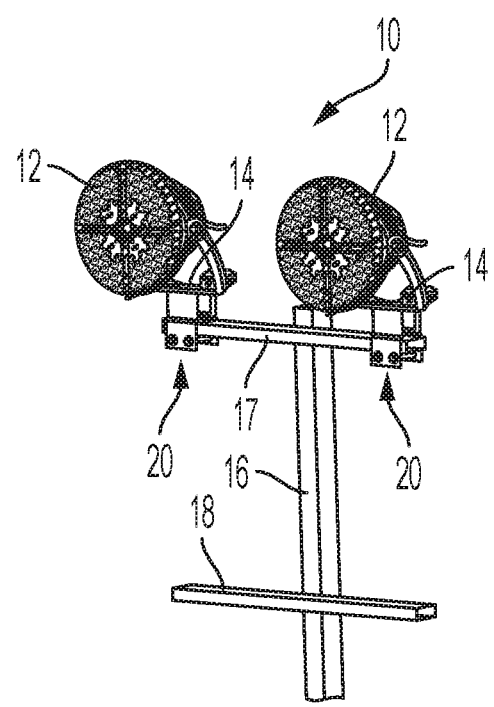
FIG. 1B illustrates a front perspective view of the example lighting configuration of FIG. 1A.

Referring to FIGS. 1A-1B, a lighting tower 10 in accordance with an aspect of the disclosure is illustrated. As shown, lighting tower 10 may include a pair of light fixtures 12, with each light fixture 12 pivotally coupled to a base 14 to allow for adjustable orientation of the light fixture 12. While not specifically shown, it is to be understood that each light fixture 12 may include, e.g., a housing, an interface plate, and an optional power supply unit, and the housing may encase various components of the light fixture such as, e.g., a set of LED modules secured to form a multi-module LED structure. However, it is to be understood that light fixtures 12 need not be LED-based, and may be any appropriate light-emitting device.

Lighting tower 10 further includes a vertically-extending light pole 16, a first crossbeam 17, and a second crossbeam 18. Light pole 16 and respective crossbeams 17, 18 may be formed of any suitable material, such as, e.g., steel, aluminum, wood, etc. Additionally, crossbeams 17, 18 may be coupled to light pole 16 through any suitable attachment means such as, e.g., welding, fasteners, etc. While light fixtures 12 are only shown as being mounted on first crossbeam 17, it is to be understood that one or more light fixtures 12 may also be mounted on second crossbeam 18, and that additional crossbeams (not shown) may be coupled to light pole 16. Alternatively, only one crossbeam may be utilized.

As described above, there is often a desire to update and/or upgrade the light fixtures associated with lighting towers without replacing the larger structural features (i.e., the light pole and/or crossbeams) of the towers. However, due to variations in mounting patterns, fixture sizes, and/or spacing of the new light fixtures, significant modifications to the existing crossbeam(s) of the tower may be needed to allow for the secure mounting of the light fixtures to the crossbeam(s). Because lighting towers in facilities such as sports fields can be significantly elevate the lights above ground, such modifications may be both time-consuming and costly. To obviate the need for such modifications, and in accordance with aspects of the present disclosure, the lighting tower 10 shown in FIGS. 1A-1B provides a mount adapter assembly 20 for the coupling of each light fixture 12 without the need for modifications to the crossbeams, as will be described in further detail below.

Figure 2:
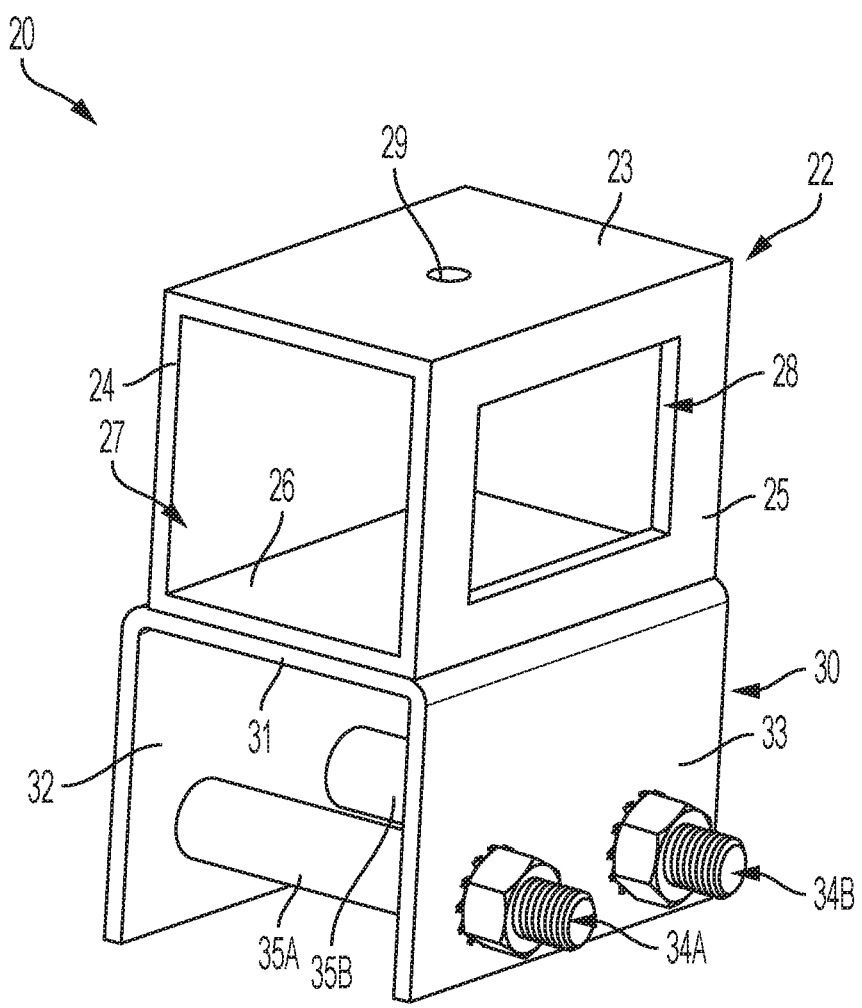
FIG. 2 illustrates a perspective view of an example mount adapter.

Referring to FIG. 2, mount adapter assembly 20 in accordance with an aspect of the disclosure is shown in greater detail. Mount adapter assembly 20 may be formed of any appropriate material or combination of materials such as, e.g., aluminum, steel, plastic, etc. Mount adapter assembly 20 includes an upper mounting portion 22 and a lower clamping portion 30. Upper mounting portion 22 is configured to support the mounting of, e.g., the base 14 of a lighting fixture 12, as shown in FIGS. 1A-1B, while lower clamping portion 30 is configured to secure the mount adapter assembly 20 to an existing crossbeam without the need for modification to the crossbeam.

Upper mounting portion 22 includes a top mounting portion wall 23, a first mounting portion sidewall 24, a second mounting portion sidewall 25, and a bottom mounting portion wall 26. An opening 27 may be formed between the top mounting portion wall 23, first mounting portion sidewall 24, second mounting portion sidewall 25, and bottom mounting portion wall 26 such that the interior of upper mounting portion 22 is visible and accessible. Additionally, second mounting portion sidewall 25 may include an opening 28 formed therein to allow even further visibility and access into the upper mounting portion 22. While not shown in FIG. 2, it is to be understood that first mounting portion sidewall 24 may also include an opening, and/or there may be no opening 28 formed in second mounting portion sidewall 25.

The top mounting portion wall 23 may include a mounting hole 29, with the mounting hole 29 sized and configured to receive, e.g., mounting hardware utilized to secure the base 14 of a lighting fixture 12. While only one mounting hole 29 is shown in FIG. 2, it is to be understood that additional mounting holes in a plurality of different patterns may be incorporated into top mounting portion wall 23, enabling lighting fixtures 12 having various mounting schemes to be coupled to the upper mounting portion 22. The mounting hardware utilized to secure the base 14 may be any appropriate hardware such as, e.g., bolts, nuts, screws, etc. One or more of the openings 27, 28 may be utilized by a utility worker or technician to easily access a portion of the mounting hardware (e.g., a nut) so as to ensure a secure connection between the base 14 and the top mounting portion wall 23.

Referring still to FIG. 2, upper mounting portion 22 is shown as being coupled to lower clamping portion 30. The coupling between upper mounting portion 22 and lower clamping portion 30 may be achieved through any appropriate method such as, e.g., welding, fastener(s), adhesive (s), etc. Lower clamping portion 30 may be arranged in a substantially inverted, U-shaped configuration, including a top clamping portion wall 31, a first clamping portion sidewall 32, and second clamping portion sidewall 33. The U-shaped configuration of lower clamping portion 30 may be achieved through any appropriate method such as, e.g., bending, stamping, welding, molding, etc. A pair of fasteners 34A, 34B are shown as extending through a pair of respective sleeves 35A, 35B, with the sleeves 35A, 35B disposed between first clamping portion sidewall 32 and second clamping portion sidewall 33. The fasteners 34A, 34B may be any appropriate fastener such as, e.g., a bolt-and-nut combination, a bar with a receptacle into which a securing pin is placed, or another fastening structure. Accordingly, as the fasteners 34A, 34B are tightened, a slight clamping force may be applied to both the first clamping portion sidewall 32 and the second clamping portion sidewall 33. In this way, the lower clamping portion 30 may be removably secured to, e.g., crossbeam 17, as is shown in FIGS. 1A-1B. While a pair of fasteners 34A, 34B and a pair of sleeves 35A, 35B are shown, it is to be understood that fewer than two or more than two fasteners and/or sleeves may be utilized. Also, the sleeves 35A, 35B are optional, and may be omitted in some embodiments.

As shown in FIGS. 1A-1B, the mount adapter assemblies 20 are capable of being mounted on a pre-existing crossbeam 17 without the need for modifications to the crossbeam 17 itself. The crossbeam 17 may be of a conventional size/shape (e.g., 2 inches tall by 4 inches wide), and thus the spacing between the first clamping portion sidewall 32 and the second clamping portion sidewall 33 may be sized accordingly, as may the spacing between the top clamping portion wall 31 and the sleeves 35A, 35B. It is to be understood that mount adapter assembly 20 is not limited to one specific size and/or shape, and may be customized to fit various crossbeams having various dimensions.

Figure 3:
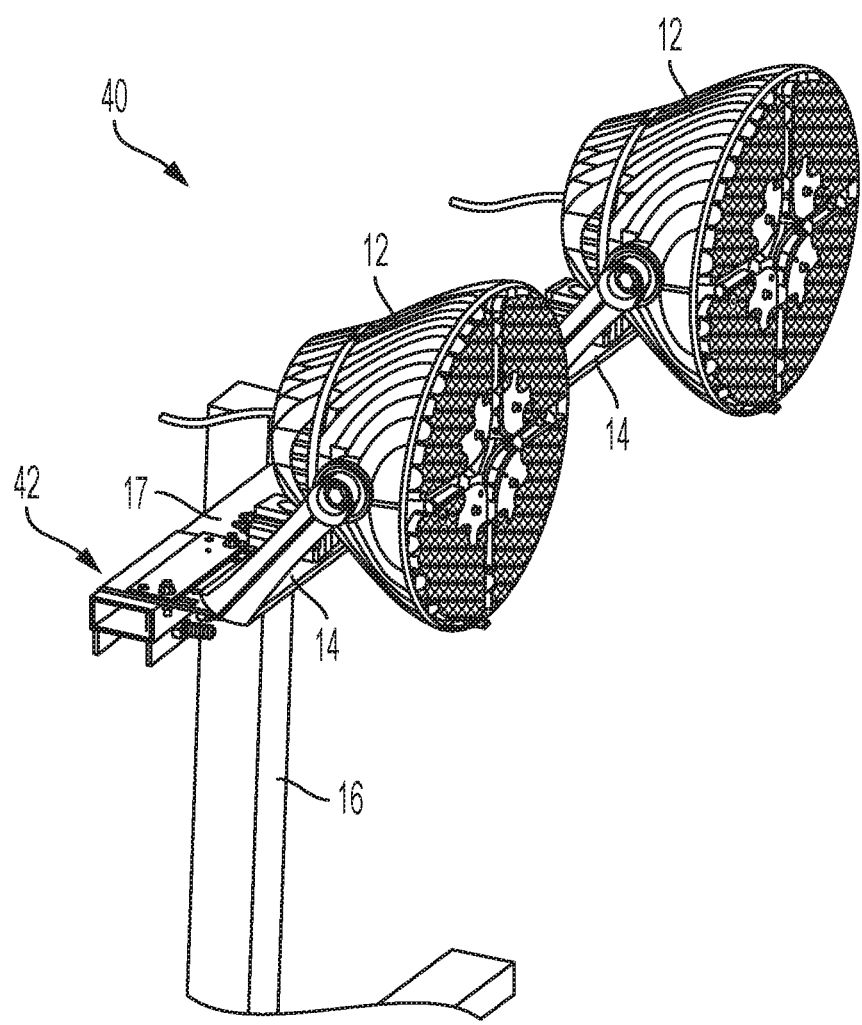
FIG. 3 illustrates a front perspective view of another example lighting configuration.

Next, referring to FIG. 3, a lighting configuration 40 in accordance with another aspect of the disclosure is illustrated. Unlike mount adapter assembly 20 described above with respect to FIGS. 1A-2, which includes a first clamping portion sidewall 32 and a second clamping portion sidewall 33 being positioned at a relatively fixed distance apart, lighting configuration 40 utilizes a mount adapter assembly 42 having an adjustable-width lower clamping portion. With such a configuration, mount adapter assembly 42 is capable of being utilized on crossbeams having various widths.

Figure 4A:
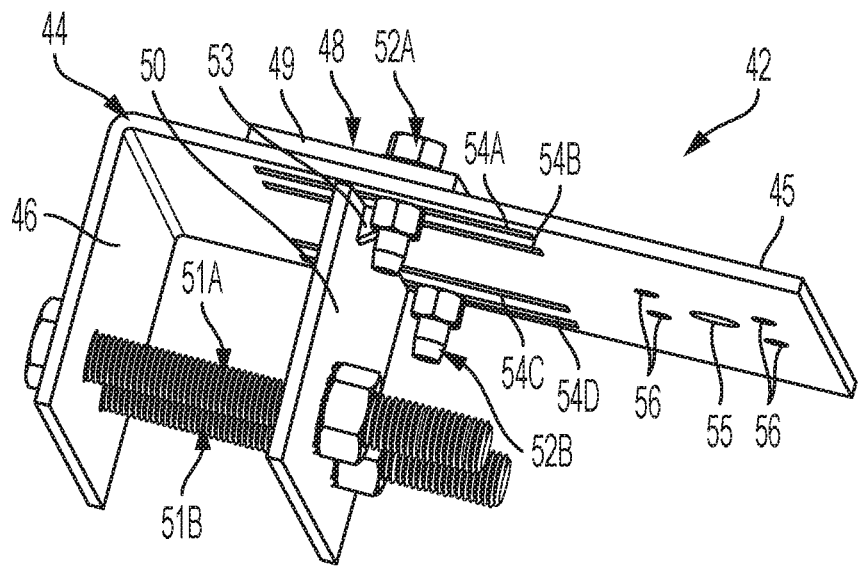
FIG. 4A illustrates a bottom perspective view of another example mount adapter.
Figure 4B:
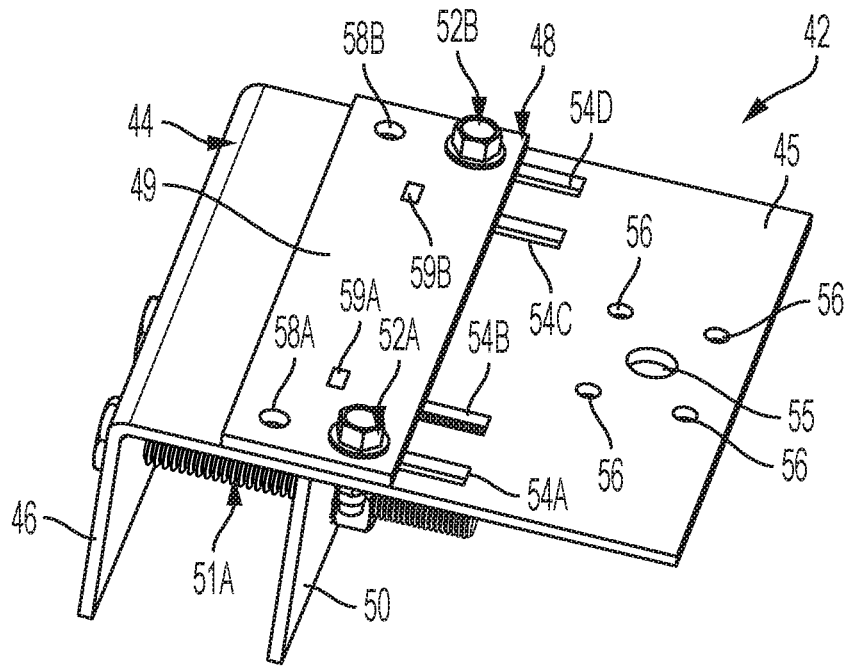
FIG. 4B illustrates a top perspective view of the example mount adapter of FIG. 4A.

Referring to FIGS. 4A-4B, mount adapter assembly 42 is shown in greater detail. Mount adapter assembly 42 includes an L-shaped stationary portion 44 having a horizontally-extending top surface 45 and a vertically-extending rear sidewall 46. The L-shaped stationary portion 44 may be formed of any appropriate material or combination of materials such as, e.g., aluminum, steel, plastic, etc., and may be formed by any appropriate method such as, e.g., bending, stamping, welding, molding, etc.

Movably coupled to L-shaped stationary portion 44 is a sliding portion 48. Sliding portion 48 includes a horizontally-extending top portion 49 and vertically-extending lower wall 50. Top portion 49 and lower wall 50 are spaced apart by the approximate thickness of top stationary portion wall 45, but are coupled together by way of tongues 53. One end of each tongue 53 is affixed or otherwise attached to the lower wall 50, while the other end of each tongue 53 is affixed or otherwise attached to the top portion 49. For example, one end of each tongue 53 may form a respective mortice-and-tenon joint 59A, 59B with the top portion 49. While only one tongue 53 is shown in FIGS. 4A-4B (associated with mortice-and-tenon joint 59A), it is to be understood that a second tongue 53 is also present (and associated with mortice-and-tenon joint 59B).

Top stationary portion wall 45 of L-shaped stationary portion 44 further includes a plurality of elongated slots 54A, 54B, 54C, 54D. Elongated slots 54A, 54B, 54C, 54D may be configured to enable sliding portion 48 to move horizontally relative to L-shaped stationary portion 44, thereby allowing for the distance between vertically-extending rear sidewall 46 and vertically-extending lower wall 50 to be varied. As is shown in FIGS. 4A-4B, the tongues 53 may extend through two of the elongated slots (i.e., slots 54B and 54C), while a pair of fasteners 52A, 52B may extend through the other two elongated slots (i.e., slots 54A and 54D) such that the sliding portion 48 is capable of being secured at a desired position relative to the elongated slots 54A, 54B, 54C, 54D formed in the L-shaped stationary portion 44. The fasteners 52A, 52B may be any appropriate fastener such as, e.g., a bolt-and-nut combination, a bar with a receptacle into which a securing pin is placed, or another fastening structure. It is to be understood that additional fasteners beyond fasteners 52A, 52B may be utilized to secure sliding portion 48. Specifically, top portion 49 may include additional through-holes 58A, 58B position and sized for the insertion of additional fasteners. Alternatively, one or both of the fasteners 52A, 52B could be inserted through the through-holes 58A, 58B, as opposed to the positions as shown in FIGS. 4A-4B.

The tongues 53 not only act to couple the top portion 49 and lower wall 50 of the sliding portion 48, but they also act to square (or hold parallel) the lower wall 50 relative to the vertically-extending rear sidewall 46, regardless of the position of the sliding portion 48 relative to the elongated slots 54A, 54B, 54C, 54D. That is, as the tongues 53 extend through a pair of elongated slots 54B, 54C, any twisting of the sliding portion 48 relative to the L-shaped stationary portion 44 can be substantially avoided.

A distal end region of the horizontally-extending top surface 45 may include a plurality of mounting holes 55, 56, with the mounting holes 55, 56 sized and configured to receive, e.g., mounting hardware utilized to secure the base 14 of a lighting fixture 12. While a single center mounting hole 55 and four surrounding mounting holes 56 are shown in FIGS. 4A-4B, it is to be understood that additional mounting holes in a plurality of different patterns may be incorporated into horizontally-extending top surface 45, enabling lighting fixtures 12 having various mounting schemes to be coupled to mount adapter assemblies 42. The mounting hardware utilized to secure the base 14 may be any appropriate hardware such as, e.g., bolts, nuts, screws, etc.

Referring still to FIGS. 4A-4B, a pair of fasteners 51A, 51B are shown as extending through both the vertically-extending rear sidewall 46 and the lower wall 50. The fasteners 51A, 51B may be any appropriate fastener such as, e.g., a bolt-and-nut combination, a bar with a receptacle into which a securing pin is placed, or another fastening structure. Although not shown in FIG. 4, the fasteners optionally may be held within sleeves such as those shown in the embodiment of FIG. 2. Accordingly, as the fasteners 51A, 51B are adjusted, the sliding portion 48 is capable of moving relative to the L-shaped stationary portion 44, and a clamping force may be applied to both the vertically-extending rear sidewall 46 and the lower wall 50 over, e.g., a crossbeam 17, as is shown in FIG. 3. In this way, the mount adapter assemblies 42 are capable of being mounted on a pre-existing crossbeam 17 without the need for modifications to the crossbeam 17 itself. Additionally, the mount adapter assemblies 42 are configured so as to be usable with crossbeams of varying widths, thereby eliminating the need for multiple versions of mount adapter assemblies for specific crossbeam widths.

Figure 5A:
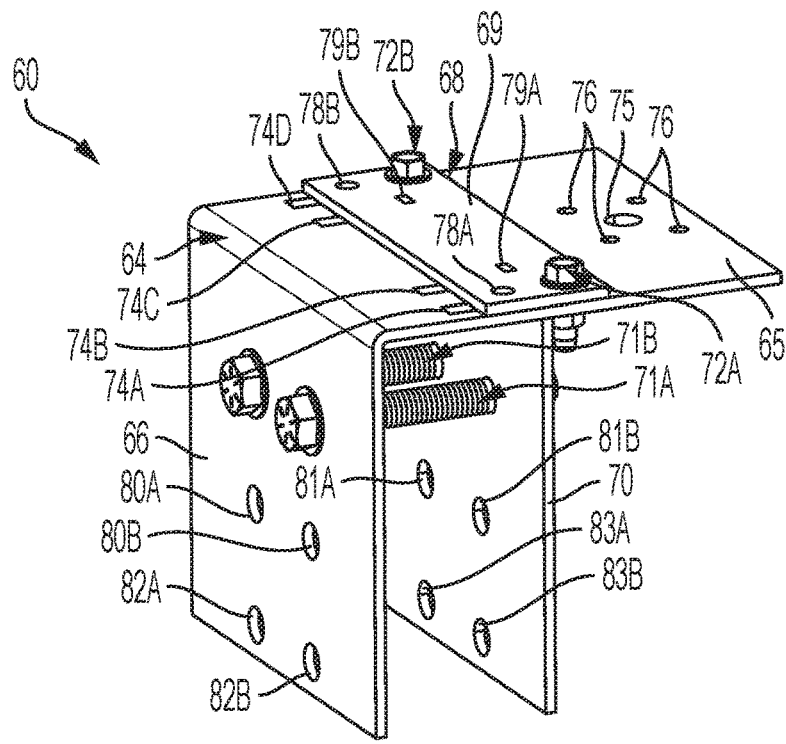
FIG. 5A illustrates a top perspective view of another example mount adapter.
Figure 5B:
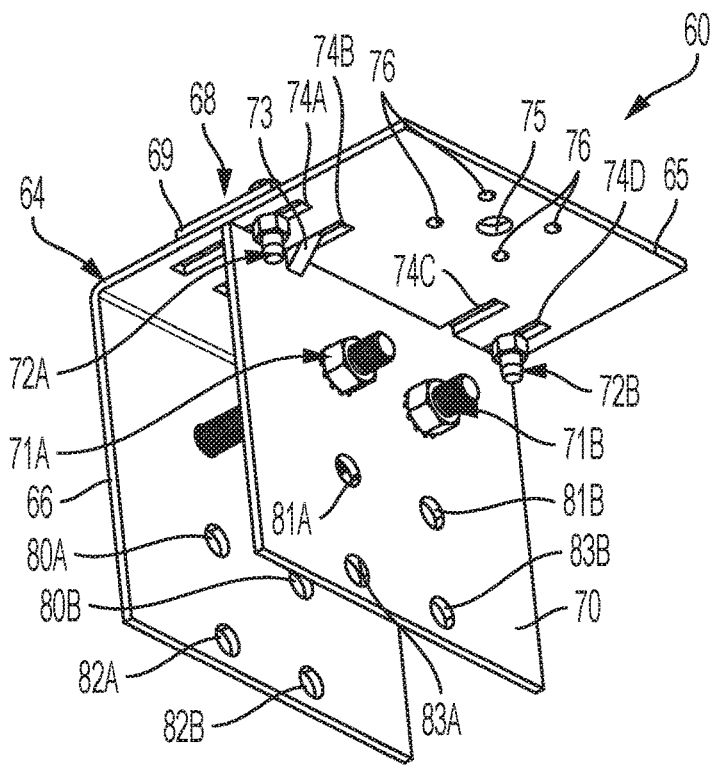
FIG. 5B illustrates a bottom perspective view of the example mount adapter of FIG. 5A.

Referring now to FIGS. 5A-5B, a mount adapter assembly 60 in accordance with another aspect of the disclosure is illustrated. Similar to mount adapter assembly 42 described above with respect to FIGS. 3-4B, mount adapter assembly 60 is configured to be usable on crossbeams of varying widths. However, unlike mount adapter assembly 42, mount adapter assembly 60 is also configured to be usable on crossbeams having varying heights, as will be set forth in further detail below.

Mount adapter assembly 60 includes an L-shaped stationary portion 64 having a horizontally-extending top surface 65 and a vertically-extending rear sidewall 66. The L-shaped stationary portion 64 may be formed of any appropriate material or combination of materials such as, e.g., aluminum, steel, plastic, etc., and may be formed by any appropriate method such as, e.g., bending, stamping, welding, molding, etc.

Movably coupled to L-shaped stationary portion 64 is a sliding portion 68. Sliding portion 68 includes a horizontally-extending top portion 69 and a vertically-extending lower wall 70. Top portion 69 and lower wall 70 are spaced apart by the approximate thickness of top stationary portion wall 65, but are coupled together by way of tongues 73. One end of each tongue 73 is affixed or otherwise attached to the lower wall 70, while the other end of each tongue 73 is affixed or otherwise attached to the top portion 69. For example, one end of each tongue 73 may form a respective mortice-and-tenon joint 79A, 79B with the top portion 69. While only one tongue 73 is shown in FIGS. 5A-5B (associated with mortice-and-tenon joint 79A), it is to be understood that a second tongue 73 is also present (and associated with mortice-and-tenon joint 79B).

Top stationary portion wall 65 of L-shaped stationary portion 64 further includes a plurality of elongated slots 74A, 74B, 74C, 74D. Elongated slots 74A, 74B, 74C, 74D may be configured to enable sliding portion 68 to move horizontally relative to L-shaped stationary portion 64, thereby allowing for the distance between vertically-extending rear sidewall 66 and vertically-extending lower wall 70 to be varied. As is shown in FIGS. 5A-5B, the tongues 73 may extend through two of the elongated slots (i.e., slots 74B and 74C), while a pair of fasteners 72A, 72B may extend through the other two elongated slots (i.e., slots 74A and 74D) such that the sliding portion 68 is capable of being secured at a desired position relative to the elongated slots 74A, 74B, 74C, 74D formed in the L-shaped stationary portion 64. The fasteners 72A, 72B may be any appropriate fastener such as, e.g., a bolt-and-nut combination, a bar with a receptacle into which a securing pin is placed, or another fastening structure. It is to be understood that additional fasteners beyond fasteners 72A, 72B may be utilized to secure sliding portion 68. Specifically, top portion 69 may include additional through-holes 78A, 78B position and sized for the insertion of additional fasteners. Alternatively, one or both of the fasteners 72A, 72B could be inserted through the through-holes 78A, 78B, as opposed to the positions as shown in FIGS. 5A-5B.

The tongues 73 not only act to couple the top portion 69 and lower wall 70 of the sliding portion 68, but they also act to square the lower wall 70 relative to the vertically-extending rear sidewall 66, regardless of the position of the sliding portion 68 relative to the elongated slots 74A, 74B, 74C, 74D. That is, as the tongues 73 extend through a pair of elongated slots 74B, 74C, any twisting of the sliding portion 68 relative to the L-shaped stationary portion 64 can be substantially avoided.

A distal end region of the horizontally-extending top surface 65 may include a plurality of mounting holes 75, 76, with the mounting holes 75, 76 sized and configured to receive, e.g., mounting hardware utilized to secure the base 14 of a lighting fixture 12. While a single center mounting hole 75 and four surrounding mounting holes 76 are shown in FIGS. 5A-5B, it is to be understood that additional mounting holes in a plurality of different patterns may be incorporated into horizontally-extending top surface 65, enabling lighting fixtures 12 having various mounting schemes to be coupled to mount adapter assemblies 60. The mounting hardware utilized to secure the base 14 may be any appropriate hardware such as, e.g., bolts, nuts, screws, etc.

Referring still to FIGS. 5A-5B, a pair of fasteners 71A, 71B are shown as extending through both the vertically-extending rear sidewall 66 and the lower wall 70. The fasteners 71A, 71B may be any appropriate fastener such as, e.g., a bolt-and-nut combination, a bar with a receptacle into which a securing pin is placed, or another fastening structure. Although not shown in FIG. 5, the fasteners optionally may be held within sleeves such as those shown in the embodiment of FIG. 2. Accordingly, as the fasteners 71A, 71B are adjusted, the sliding portion 68 is capable of moving relative to the L-shaped stationary portion 64, and a clamping force may be applied to both the vertically-extending rear sidewall 66 and the lower wall 70 over, e.g., a crossbeam 17. In this way, the mount adapter assemblies 60 are capable of being mounted on a pre-existing crossbeam 17 without the need for modifications to the crossbeam 17 itself. Additionally, the mount adapter assemblies 60 are configured so as to be usable with crossbeams of varying widths, thereby eliminating the need for multiple versions of mount adapter assemblies for specific crossbeam widths.

Additionally, as noted above, mount adapter assemblies 60 are also configured to be usable with crossbeams of varying heights. Specifically, mount adapter assemblies 60 include a plurality of aligned through-hole pairs in both the vertically-extending rear sidewall 66 and the lower wall 70 to accommodate not only crossbeams of varying widths, but also varying heights. As is shown in FIGS. 5A-5B, the vertically-extending rear sidewall 66 includes associated pairs of through-holes 80A, 80B and 82A, 82B, which are horizontally aligned with respective associated pairs of through-holes 81A, 81B and 83A, 83B in the lower wall 70. In this way, the fasteners 71A, 71B can be selectively inserted through an appropriate associated pair of through-holes in each of the vertically-extending rear sidewall 66 and the lower wall 70, dependent upon the height of the crossbeam upon which mount adapter assembly 60 is to be secured. Accordingly, mount adapter assemblies 60 can be configured for use on crossbeams of many sizes, including crossbeams of varying widths and heights.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A mount adapter assembly for use with light fixtures on a lighting tower, comprising:
    an upper mounting portion, the upper mounting portion comprising:
        a top mounting portion wall,
        a first mounting portion sidewall,
        a second mounting portion sidewall, and
        a bottom mounting portion wall,
        wherein the top mounting portion wall includes at least one mounting hole configured for the coupling of a light fixture to the mount adapter assembly; and
    a lower clamping portion coupled to the upper mounting portion, the lower clamping portion comprising:
        a top clamping portion wall,
        a first clamping portion sidewall,
        a second clamping portion sidewall opposite the first clamping portion sidewall, and
        at least one fastener extending through both the first clamping portion sidewall and the second clamping portion sidewall so as to apply a clamping force between the first clamping portion sidewall and the second clamping portion sidewall.

2. The mount adapter assembly of claim 1, wherein at least one of the first mounting portion sidewall and the second mounting portion sidewall includes an opening formed to allow access to an interior of the upper mounting portion.

3. The mount adapter assembly of claim 1, wherein the lower clamping portion is formed in an inverted U-shape.

4. The mount adapter assembly of claim 1, further comprising at least one sleeve extending between the first clamping portion sidewall and the second clamping portion sidewall.

5. The mount adapter assembly of claim 1, wherein the at least one fastener comprises at least one bolt-and-nut configuration.

6. The mount adapter assembly of claim 1, wherein the top clamping portion wall of the lower clamping portion is coupled to the bottom mounting portion wall of the upper mounting portion.

7. The mount adapter assembly of claim 1, wherein a space between the first clamping sidewall portion and the second clamping sidewall portion is sized to accommodate the width of a crossbeam of the lighting tower, and further wherein a space between the top clamping portion wall and the at least one fastener is sized to accommodate the height of the crossbeam.

8. The mount adapter assembly of claim 4, wherein the at least one fastener extends through the at least one sleeve.

9. A mount adapter assembly for use with light fixtures on a lighting tower, comprising:
    an L-shaped stationary portion, the L-shaped stationary portion comprising:
        a horizontally-extending top surface, and
        a vertically-extending rear sidewall,
        wherein the horizontally-extending top surface includes at least one mounting hole configured for the coupling of a light fixture to the mount adapter assembly;
    a sliding portion, the sliding portion comprising:
        a horizontally-extending top portion, and
        a vertically-extending lower wall; and
    at least one fastener extending through both the vertically-extending rear sidewall of the L-shaped stationary portion and the vertically-extending lower wall of the sliding portion so as to apply a clamping force between the vertically-extending rear sidewall and the vertically-extending lower wall.

10. The mount adapter assembly of claim 9, wherein the horizontally-extending top surface includes a plurality of elongated slots.

11. The mount adapter assembly of claim 9, wherein the at least one fastener comprises a pair of fasteners.

12. The mount adapter assembly of claim 10, wherein the horizontally-extending top portion and the vertically-extending lower wall of the sliding portion are coupled by a pair of tongues extending through a pair of the elongated slots.

13. The mount adapter assembly of claim 10, further comprising at least one additional fastener configured to extend through at least one of the elongated slots so as to secure the sliding portion relative to the L-shaped stationary portion.

14. The mount adapter assembly of claim 11, further comprising a plurality of associated through-hole pairs formed through the respective vertically-extending lower wall and the vertically-extending rear sidewall, wherein the through-hole pairs are positioned vertically relative to one another and are configured to allow for the pair of fasteners to be coupled to the vertically-extending lower wall and the vertically-extending rear sidewall at various points.

15. The mount adapter assembly of claim 12, wherein the pair of tongues are configured to maintain the vertically-extending lower wall parallel relative to the vertically-extending rear sidewall.

16. A mount adapter assembly for use with light fixtures on a lighting tower, comprising:
    an L-shaped stationary portion, the L-shaped stationary portion comprising:
        a horizontally-extending top surface, and
        a vertically-extending rear sidewall, wherein the vertically-extending rear sidewall includes a plurality of through-hole pairs positioned vertically relative to one another, and further wherein the horizontally-extending top surface includes at least one mounting hole configured for the coupling of a light fixture to the mount adapter assembly;

a sliding portion, the sliding portion comprising:
a horizontally-extending top portion, and
a vertically-extending lower wall,
wherein the vertically-extending lower wall includes a plurality of through-hole pairs positioned relative to one another; and a pair of fasteners extending through respective through-hole pairs of the vertically-extending rear sidewall of the L-shaped stationary portion and the vertically-extending lower wall of the sliding portion so as to apply a clamping force between the vertically-extending rear sidewall and the vertically-extending lower wall.

17. The mount adapter assembly of claim 16, wherein the horizontally-extending top surface includes a plurality of elongated slots.

18. The mount adapter assembly of claim 17, wherein the horizontally-extending top portion and the vertically-extending lower wall of the sliding portion are coupled by a pair of tongues extending through a pair of the elongated slots.

19. The mount adapter assembly of claim 17, further comprising at least one additional fastener configured to extend through at least one of the elongated slots so as to secure the sliding portion relative to the L-shaped stationary portion.

20. The mount adapter assembly of claim 18, wherein the pair of tongues are configured to maintain the vertically-extending lower wall parallel relative to the vertically-extending rear sidewall.

* * * * *